US012601892B2

(12) United States Patent
Weber et al.

(10) Patent No.: US 12,601,892 B2
(45) Date of Patent: Apr. 14, 2026

(54) ELECTRONIC DEVICE SYSTEM WITH SUPPLEMENTAL LENSES

(71) Applicant: Apple Inc., Cupertino, CA (US)

(72) Inventors: Andreas G. Weber, Los Altos, CA (US); Jeremy C. Franklin, San Francisco, CA (US); Jason C. Sauers, Sunnyvale, CA (US); Victoria C. Chan, Sunnyvale, CA (US); Wey-Jiun Lin, Los Altos Hills, CA (US)

( * ) Notice: Subject to any disclaimer, the term of this patent is extended or adjusted under 35 U.S.C. 154(b) by 0 days.

(21) Appl. No.: 19/014,006

(22) Filed: Jan. 8, 2025

(65) Prior Publication Data

US 2025/0147270 A1     May 8, 2025

Related U.S. Application Data

(63) Continuation of application No. 18/807,829, filed on Aug. 16, 2024, which is a continuation of application
(Continued)

(51) Int. Cl.
*G02B 7/14*          (2021.01)
*G02B 7/02*          (2021.01)
(Continued)

(52) U.S. Cl.
CPC ............... *G02B 7/14* (2013.01); *G02B 7/023* (2013.01); *G02B 27/0093* (2013.01);
(Continued)

(58) Field of Classification Search
CPC ............ G02B 27/0176; G02B 27/0172; G02B 27/017; G02B 27/0093; G02C 2200/08; G02C 2200/02; G06F 3/013
See application file for complete search history.

(56) References Cited

U.S. PATENT DOCUMENTS 5,000,556 A  *  3/1991  Katsuma ................ G02B 15/02
                                                      359/407
5,479,224 A     12/1995  Yasugaki et al.
                      (Continued)

FOREIGN PATENT DOCUMENTS

CN          104345454 A     2/2015
CN          105223692 A     1/2016
                      (Continued)

*Primary Examiner* — Ephrem Z Mebrahtu
(74) *Attorney, Agent, or Firm* — Treyz Law Group, P.C.; David K. Cole

(57)          ABSTRACT

A head-mounted device may have a display that displays content for a user. Head-mounted support structures in the device support the device on the head of the user. A non-removable lens system may be supported by the head-mounted support structures. The head-mounted support structures may be configured to receive a removable supplemental lens system. The removable supplemental lens system may be used to customize the head-mounted display to accommodate the user's vision. Information such as information on the optical characteristics of the removable supplemental lens system and the user's eyeglass prescription may be stored in the removable supplemental lens system using bar codes, text, programmable memory, or other data storage. When the removable supplemental lens system is installed in the head-mounted device, control circuitry in the head-mounted device may retrieve the stored information. A gaze tracker system or other sensors may be used in retrieving the stored information.

17 Claims, 4 Drawing Sheets

Related U.S. Application Data

No. 16/276,286, filed on Feb. 14, 2019, now abandoned.

(60) Provisional application No. 62/712,108, filed on Jul. 30, 2018.

(51) Int. Cl.
| | |
|---|---|
| *G02B 27/00* | (2006.01) |
| *G06F 1/16* | (2006.01) |
| *G06F 3/01* | (2006.01) |
| *G06F 16/955* | (2019.01) |
| *G06K 19/06* | (2006.01) |

(52) U.S. Cl.
CPC .............. *G06F 1/163* (2013.01); *G06F 3/013* (2013.01); *G06F 16/9554* (2019.01); *G06K 19/06028* (2013.01); *G06K 19/0614* (2013.01)

(56) References Cited

U.S. PATENT DOCUMENTS

| | | | |
|---|---|---|---|
| 5,568,207 | A | 10/1996 | Chao |
| 6,027,214 | A | 2/2000 | Graham |
| 6,244,705 | B1 | 6/2001 | Ledbetter et al. |
| 6,496,161 | B1 | 12/2002 | Tanaka |
| 7,600,870 | B2 * | 10/2009 | Zelazowski ............. G02C 9/00 |
| | | | 351/57 |
| 7,840,444 | B2 | 11/2010 | Mellon et al. |
| 9,406,253 | B2 | 8/2016 | Blanche et al. |
| 2004/0212776 | A1 | 10/2004 | Spitzer et al. |
| 2010/0103284 | A1 | 4/2010 | Sugimori |
| 2013/0208234 | A1 | 8/2013 | Lewis |
| 2014/0266990 | A1 | 9/2014 | Makino et al. |
| 2015/0355481 | A1 | 12/2015 | Hilkes et al. |
| 2016/0286203 | A1 | 9/2016 | Border et al. |
| 2016/0334643 | A1 | 11/2016 | Hyde et al. |
| 2017/0031435 | A1 | 2/2017 | Raffle et al. |
| 2018/0046859 | A1 | 2/2018 | Jarvenpaa |
| 2018/0053050 | A1 | 2/2018 | Kingsbury et al. |
| 2018/0129075 | A1 * | 5/2018 | Zewe ..................... B29D 12/02 |
| 2018/0256304 | A1 | 9/2018 | Sheena |
| 2019/0028697 | A1 | 1/2019 | Sullivan et al. |
| 2019/0041644 | A1 | 2/2019 | Abele et al. |
| 2019/0056590 | A1 * | 2/2019 | Chuang ................ H04N 13/344 |
| 2019/0258442 | A1 * | 8/2019 | Hudman ............ G02B 27/0176 |
| 2019/0265514 | A1 | 8/2019 | Richards et al. |
| 2021/0208399 | A1 * | 7/2021 | Wei .................... G02B 27/0172 |

FOREIGN PATENT DOCUMENTS

| | | | |
|---|---|---|---|
| CN | 105259656 | A | 1/2016 |
| CN | 204964878 | U | 1/2016 |
| CN | 206039051 | U | 3/2017 |
| CN | 106662750 | A | 5/2017 |
| EP | 3296792 | A1 | 3/2018 |
| JP | H0483380 | A | 3/1992 |
| JP | H04138432 | A | 5/1992 |
| JP | H0753946 | A | 2/1995 |
| JP | H08082762 | A | 3/1996 |
| JP | 2000284234 | A | 10/2000 |
| JP | H0646356 | A | 2/2006 |
| JP | H0882752 | A | 4/2008 |
| JP | 2010506476 | A | 2/2010 |
| JP | 2010228038 | A | 10/2010 |
| JP | 2012008290 | A | 1/2012 |
| JP | 2014174519 | A | 9/2014 |
| JP | 2017117455 | A | 6/2017 |
| JP | 2018501498 | A | 1/2018 |
| KR | 20160110350 | A | 9/2016 |
| WO | 2014100891 | A1 | 7/2004 |
| WO | 2014174067 | A1 | 10/2014 |
| WO | 2015107817 | A1 | 7/2015 |
| WO | 2015139561 | A1 | 9/2015 |
| WO | 2018123195 | A1 | 7/2018 |

* cited by examiner

ELECTRONIC DEVICE SYSTEM WITH SUPPLEMENTAL LENSES

This application is a continuation of U.S. patent application Ser. No. 18/807,829, filed Aug. 16, 2024, which is a continuation of U.S. patent application Ser. No. 16/276,286, filed Feb. 14, 2019, which claims the benefit of provisional patent application No. 62/712,108, filed Jul. 30, 2018, which are hereby incorporated by reference herein in their entireties.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems with lenses. The lenses allow displays in the devices to present visual content to users.

Some users of head-mounted devices have visual defects such as myopia, hyperopia, astigmatism, or presbyopia. It can be challenging to ensure that an optical system in a head-mounted device operates satisfactorily for these users. If care is not taken, it may be difficult or impossible for a user with visual defects to focus properly on content that is being displayed.

SUMMARY

A head-mounted device may have a display that displays content for a user. Head-mounted support structures in the device may support the device on the head of the user. A non-removable lens system may be supported by the head-mounted support structures and may be used to present content on the display to eye boxes. The user may view the content when the user's eyes are located in the eye boxes.

The head-mounted support structures may be configured to receive a removable supplemental lens system in alignment with the non-removable lens system. Magnetic coupling structures or other engagement structures may be used to removably couple the supplemental lens system to the head-mounted device.

The removable supplemental lens system may be used to adjust the lens characteristics of the non-removable lens system and thereby customize the head-mounted display to accommodate the user's vision. For example, the removable supplemental lens system may include supplemental left and right lenses that align with and supplement corresponding left and right lenses in the non-removable lens system and that include astigmatic lens characteristics and other characteristics that allow the head-mounted device to be used by a user with astigmatism or other visual defects.

Removable supplemental lens systems associated with different users may be configured to operate with a shared head-mounted device. To ensure that the head-mounted device can customize its operation for each user, the removable supplemental lens system of each user may be provided with information that identifies the user associated with that removable supplemental lens system and other stored information. This information may be stored in the removable supplemental lens system using bar codes or other optically readable patterns, programmable memory, or other data storage. A memory reader, gaze tracking system, or other sensor may be used in retrieving the stored information.

The information that is stored in the removable supplemental lens system may include information on the optical characteristics of the removable supplemental lens system, user information such as the user's eyeglass prescription, and/or other information. When the removable supplemental lens system is installed in the head-mounted device, control circuitry in the head-mounted device may retrieve the stored information and may take appropriate action. For example, the control circuitry may use lens positioners to adjust lens spacing and other operating parameters of the lens systems based on the user's interpupillary distance and other information on the user.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a display formed from one or more display panels (displays) for displaying visual content to a user. A lens system may be used to allow the user to focus on the display and view the visual content. To ensure that a wide range of users are able to clearly focus on the display and view visual content, the head-mounted device may receive removable supplemental lenses. The supplemental lenses may address the visual defects of users that are not otherwise addressed by the lens system. For example, a user with astigmatism may have supplemental lenses that correct for astigmatism. When this user desires to view content with the head-mounted device, the supplemental lenses may be installed within the head-mounted device to help correct for the user's astigmatism. With one illustrative arrangement, the supplemental lenses may be coupled to the head-mounted support structures using magnets or other removable fasteners that attach the supplemental lenses to non-removable lenses in the device.

If desired, removable supplemental lenses may be provided with the ability to store information that is subsequently retrieved and used by the head-mounted device. This information, which may sometimes be referred to as supplemental lens information or stored information may include lens power information and other information that is specific to the supplemental lenses and/or user information for a user associated with the lenses (e.g., a username, eyeglasses prescription information, etc.). Storage circuitry such as programmable read-only memory may be used to store the supplemental lens information and/or the supplemental lens information may be stored in other ways (e.g., using bar codes, text on the supplemental lenses, other patterned optically readable information, etc.). During operation, after a user has installed the supplemental lenses in a head-mounted device, the head-mounted device may retrieve and use the supplemental lens information. For example, information on the optical characteristics of the lens may be used by the head-mounted device to help correct for optical aberrations in the lenses (e.g., spherical aberration, chromatic aberration, pincushion distortion, barrel distortion, etc.), information on the user may be used to adjust the interpupillary distance of lenses or may be used to present the user with a login screen that has been prepopulated with the user's username, etc.

Figure 1:
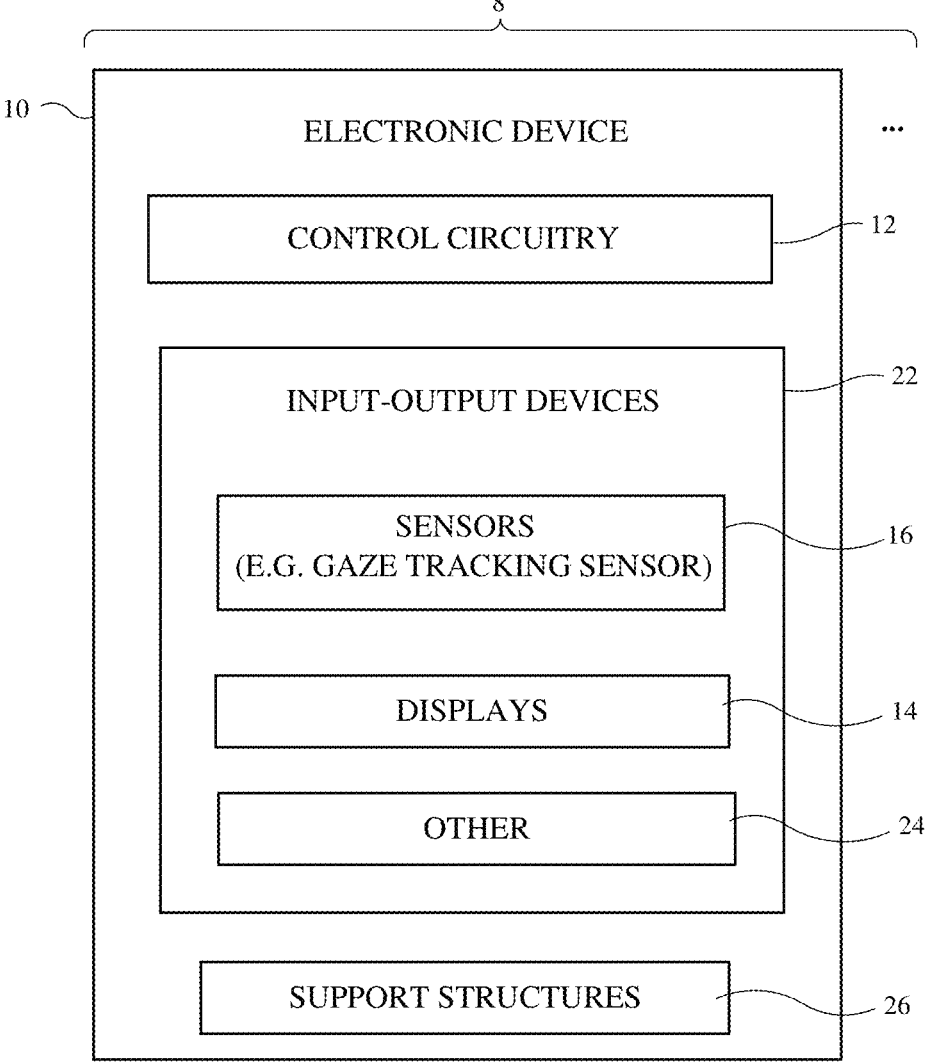
FIG. 1 is a schematic diagram of an illustrative electronic device such as a head-mounted display device in accordance with an embodiment.

A schematic diagram of an illustrative system that may use supplemental head-mounted display lenses is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involved in processing three-dimensional facial image data, operations involving the adjustment of components using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display(s) 14. In some configurations, display 14 of device 10 includes left and right display panels in alignment with the user's left and right eyes, respectively. In other configurations, display 14 includes a single display panel that extends across both eyes.

Display 14 may be used to display images. The visual content that is displayed on display 14 may be viewed by a user of device 10. Displays in device 10 such as display 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Display 14 may present computer-generated content such as virtual reality content and mixed reality content to a user. Virtual reality content may be displayed in the absence of real-world content. Mixed reality content, which may sometimes be referred to as augmented reality content, may include computer-generated images that are overlaid on real-world images. The real-world images may be captured by a camera (e.g., a forward-facing camera) and merged with overlaid computer-generated content or an optical coupling system may be used to allow computer-generated content to be overlaid on top of real-world images. As an example, a pair of mixed reality glasses or other augmented reality head-mounted display may include a display device that provides images to a user through a beam splitter, prism, holographic coupler, or other optical coupler. Configurations in which display 14 is used to display virtual reality content to a user through lenses are described herein as an example.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
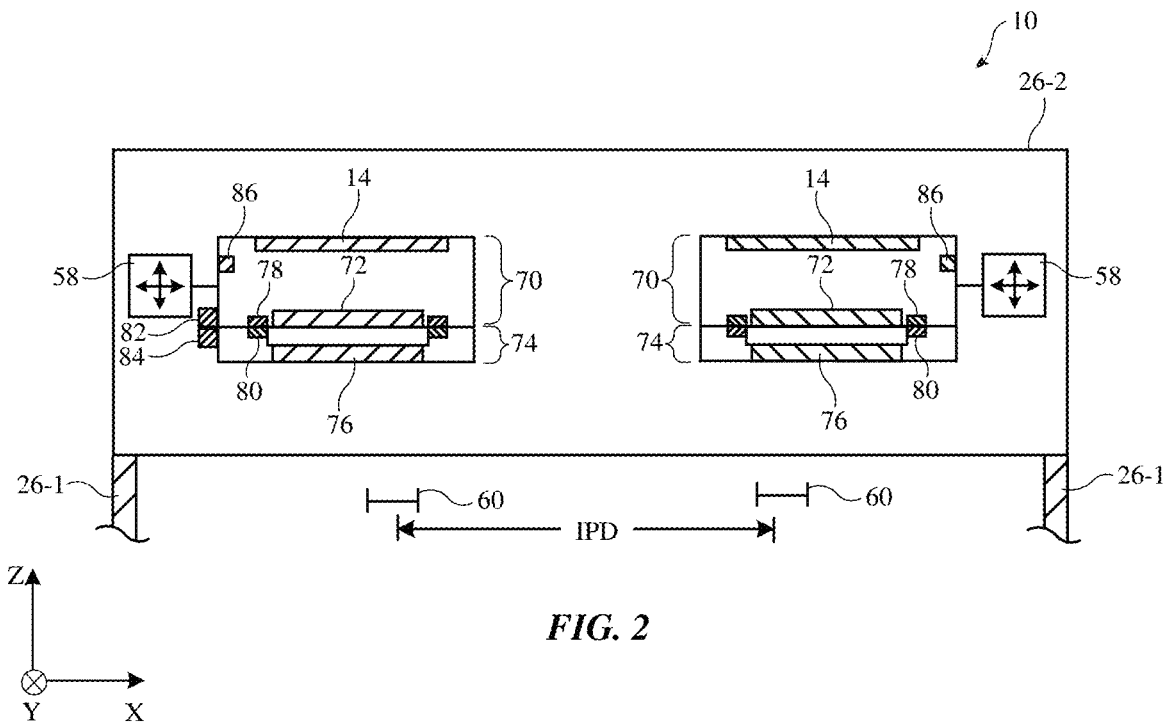
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, structures that form housing walls and other structures for main unit 26-2 and straps or other supplemental support structures such as structures 26-1 that help to hold main unit 26-2 on a user's face so that the user's eyes are located within eye boxes 60.

Display 14 may include left and right display panels (e.g., left and right pixel arrays, sometimes referred to as left and right displays) that are mounted respectively in left and right display modules 70 corresponding respectively to a user's left eye (and left eye box 60) and right eye (and right eye box). Modules 70, which may sometimes be referred to as lens support structures or lens housings, may be individually positioned relative to the housing wall structures of main unit 26-2 and relative to the user's eyes using respective left and right positioners 58 (e.g., stepper motors, piezoelectric actuators, motors, linear electromagnetic actuators, and/or other electronic components for adjusting position). Positioners 58 may be controlled by control circuitry 12 during operation of device 10. For example, positioners 58 may be used to adjust the spacing between modules 70 (and therefore the lens-to-lens spacing between the lenses of modules 70) to match the interpupillary distance IPD of a user's eyes.

Device 10 may include a non-removable lens system (sometimes referred to as a permanent lens system or fixed lens system) to which the user of device 10 may attach removable supplemental lenses to accommodate the user's vision (astigmatism, etc.). When the removable supplemental lenses are absent, a user may use the non-removable lens system. Users with particular visual defects (e.g., astigmatism), may benefit from the attachment of the removable supplemental lenses to the non-removable lenses. When the supplemental lenses are coupled to device 10 in alignment with the non-removable lenses, the supplemental lenses and non-removable lenses operate together to form a combined lens system with combined optical properties determined by both the non-removable lenses and the supplemental lenses.

As shown in FIG. 2, for example, each lens module 70 may include a non-removable lens 72. Lenses 72 may be Fresnel lenses, single-element or multiple-element lenses formed from clear materials such as glass or plastic, mirror lenses, catadioptric lenses, and/or lenses of other types. The position of lenses 72 along the X axis may be adjusted so that lenses 72 are separated by a distance that matches the user's interpupillary distance (distance IPD). The position of lenses 72 along the Z axis may be adjusted to help a user focus on display 14.

The amount of travel available to lenses 72 may be limited and/or lenses 72 may have attributes that make it difficult for lenses 72 alone to be used to view content on display 14 by all users. For example, a user may have astigmatism or may be strongly nearsighted or farsighted. In situations such as these, lenses 72 when used alone may not be able to correct for the user's vision. To ensure that the user's vision is fully corrected, supplemental lenses 76 may be coupled to lenses 72 to provide further adjustments. For example, if a user is astigmatic, supplemental lenses 76 may be configured to compensate for the astigmatism of the user. If there are multiple users associated with device 10, each of the multiple users may potentially have a different respective set of supplemental lenses 76. Lenses 76 may be joined together to form a supplemental lens system based on a single supplemental lens module or may be housed in separate lens modules that form a multi-lens-module supplemental lens system.

As shown in FIG. 2, for example, supplemental lenses 76 may be mounted in supplemental lens modules (sometimes referred to as supplemental lens support structures or housings) such as supplemental lens modules 74. Lens modules 74 may be removably coupled to support structures 26 by using coupling structures 78 in non-removable lens modules 70 and corresponding coupling structures that mate with coupling structures 78 such as coupling structures 80 in removable lens modules 74 to couple lens modules 74 to lens modules 70. Coupling structures 78 and 80 may be formed from magnetic couplers (e.g., magnets and/or magnetic structures such as iron bars), clips, hook-and-loop fasteners, snaps, screws and other threaded fasteners, temporary adhesive, spring-loaded engagement structures, and/or other coupling mechanisms.

Device 10 may include a gaze detection system that is configured to monitor a user's eyes in eye boxes 60. The gaze detection system may, as an example, use optical eye monitoring components to monitor the user's direction of gaze as the user is using device 10. With one illustrative configuration, a gaze tracker such as gaze tracker 86 may be located in each lens module 70. In this position, the gaze tracker 86 in each lens module 70 may monitor a user's eye in a respective eye box 60 through a respective lens 72 and a respective mating supplemental lens 76. Gaze trackers 86 may be placed at peripheral portions of lens modules 70 so that gaze trackers 86 do not block the user's view of display 14 through removable lenses 76 and non-removable lenses 72.

If desired, the removable lens system of FIG. 2 (e.g., one or both of lens modules 74 and/or a single removable lens holder that is configured to support both of removable lenses 76) may be provided with electronic storage such as storage 84. Storage 84 may be programmable read-only memory (e.g., electrically programmable read-only memory, memory formed from laser-programmed fuses, and/or other programmable memory), may be formed from a pattern of metal traces and/or resistive elements (e.g., to encode information in the form of a pattern of conductive paths, a pattern of resistors and/or their associated resistance values, and/or other circuitry that is configured to serve as storage that stores data in the removable lenses for electrical retrieval by device 10). Storage 84, which may be formed as part of the removable lens system (e.g., as part of one or more of modules 74 and associated removable lenses 76), may be used in storing lens information, user information, and/or other information electrically. When the removable lens system is coupled to the non-removable lens system (e.g., one or both lens modules 70 such as storage 84), electrically stored information reader 82 may retrieve the data stored in storage 84. Information reader 82 may be, for example, an electrically programmed read-only memory reader, a memory reader that reads laser-programmed storage or other programmable memory, circuitry that electrically measures storage 84 (e.g., to detect a pattern of conductive traces and/or resistive elements that are being used to store data), and/or other reader circuitry.

Information such as lens information, user information, and other information may also be stored using non-electrical storage. This storage may include, for example, bar codes, text, patterns of dots, and/or other information that can be detected optically. Optical data reading operations may be performed using infrared and/or visible cameras or other equipment (e.g., bar code scanning equipment) that reads optically encoded information. As an example, optical data reading equipment that reads data on the removable lens by imaging the removable lens such as infrared digital image sensors in gaze tracking sensors 86 and/or visible-light digital image sensors may be used in reading bar codes, text, and/or other optically encoded information.

Gaze trackers 86 (sometimes referred to as gaze monitoring systems, gaze tracking systems, eye monitoring systems, etc.) may monitor the eyes of the user in eye boxes 60 during operation of device 10. Gaze trackers 86 may include light sources and light-detecting components such as image sensors. Each gaze tracker 86 may, as an example, include a light source such as a light-emitting diode light source or laser light source that produces an array of light beams (e.g., infrared light beams that do not interfere with the vision of the user). Blanket (flood) illumination at infrared and/or visible wavelengths may also be provided. Each gaze tracker 86 may also include a respective infrared image sensor (and/or visible-light image sensor) that faces a user's eye in a respective eye box 60 and capture images of the user's eye through lenses 72 and lenses 76 while the user's eye is being illuminated with the light beams from the light source of that gaze tracker. During normal operation, control circuitry 20 may use gaze trackers 86 to track a user's gaze (e.g., so that images being displayed on displays 14 can be adjusted based on the direction of the user's gaze, etc.). When it is desired to read information in the removable lens system that has been optically stored (e.g., by encoding the information in the form of a bar code, text, etc.), one or more image sensors such as one or more infrared image sensors in one or more gaze trackers 86 may optically read the information from the supplemental lens system (e.g., from one or more lens modules 74).

Figure 3:
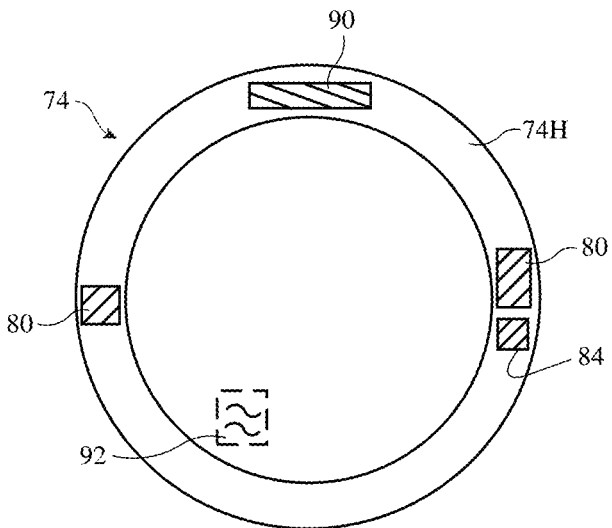
FIG. 3 is a diagram of an illustrative removable supplemental lens in accordance with an embodiment.

FIG. 3 is a front view of an illustrative removable lens module showing arrangements that may be used to store information in the lens module. As shown in FIG. 3, lens module 74 may include lens support structures 74H. Support structures 74H may be formed from polymer, metal, and/or other materials and may surround or otherwise support lens 76 to form lens module 74. Coupling structures 80 may be supported by support structures 74H, so that coupling structures 80 hold lens module 74 to lens module 70 and support structures 26 when coupling structures 80 are coupled to mating coupling structures 78 in lens module 70.

Lens information, user information, and other information can be stored in removable lens module 74 using one or more approaches. With one illustrative arrangement, electrical storage 84 is included in lens module 74. Data may be stored in electrical storage 84. When removable lens module 74 is coupled to non-removable lens module 70, reader 82 may couple to electrical storage 84 and may retrieve the stored data from electrical storage 84.

With another illustrative arrangement, a bar code such as bar code 92 may be included in lens module 74. Bar code 92 may, as an example, be an infrared bar code that is formed from an ink that is visibly transparent while being opaque to infrared light (e.g., infrared light at the wavelength emitted by an infrared light source in gaze tracker 86) or other bar code structure that is transparent to visible light and opaque at infrared wavelengths. With this type of arrangement, bar code 92 will be transparent to the user and will not interfere with the user's viewing of content on display 14, even though bar code 92 is formed on lens 76. At the same time, gaze tracker 86 is pointed towards lens 76 so that gaze tracker 86 may capture an image of bar code 92 at infrared wavelengths.

Bar codes, text information, or other visible-light (and/or infrared light) markings may be formed from laser markings, patterned ink, patterned metal coatings, and/or other markings formed in regions such as region 90. Visible-light-encoded information of this type (e.g., information stored optically) may be read by a visible light image sensor in lens module 70 or an image sensor elsewhere in device 10 (e.g., a visible light image sensor in sensors 16). In some situations, visible-light-encoded information such as text, icons, or other optically readable patterns may contain information that is recognizable to a user (e.g., text that a user can read such as the user's name or user name, an icon that a user can recognize, etc.). User recognizable information may be used to label lens modules 74 so that lens modules that belong to different users are not mixed up. An image sensor in device 10 (e.g., an image sensor in gaze tracker 87 and/or other image sensors) may optically read text, icons, or other patterned structures on the removable lens system that are also recognizable to the user and/or the image sensor may read patterns such as bar codes and other patterns that do not contain user-recognizable text or icons.

In some situations, it may be desirable to encrypt the information that is being stored in removable lens module 74. Stored information may be encrypted using a cryptographic key. Control circuitry 12 can decrypt the encrypted information using a corresponding cryptographic key suitable for decryption (which may be the same as the encrypting key or may be related to the encrypting key). Control circuitry 12 can obtain the key from the user (e.g., using input-output devices 22). If desired, control circuitry 12 can obtain the key from a remote server (e.g., an online service). A user password, username, or other information may, if desired, be gathered from the user and/or storage in device 10 and may be used by control circuitry 12 in obtaining the key from the online service. In some arrangements, keys may be stored in control circuitry 12 for use in decrypting encrypted information stored in lens module 74 (e.g., when device 10 is only used by the members of a single household). These illustrative arrangements and/or other arrangements for encrypting and decrypting the information stored in removable lens module 74 may be used to enhance privacy for stored user information.

Figure 4:
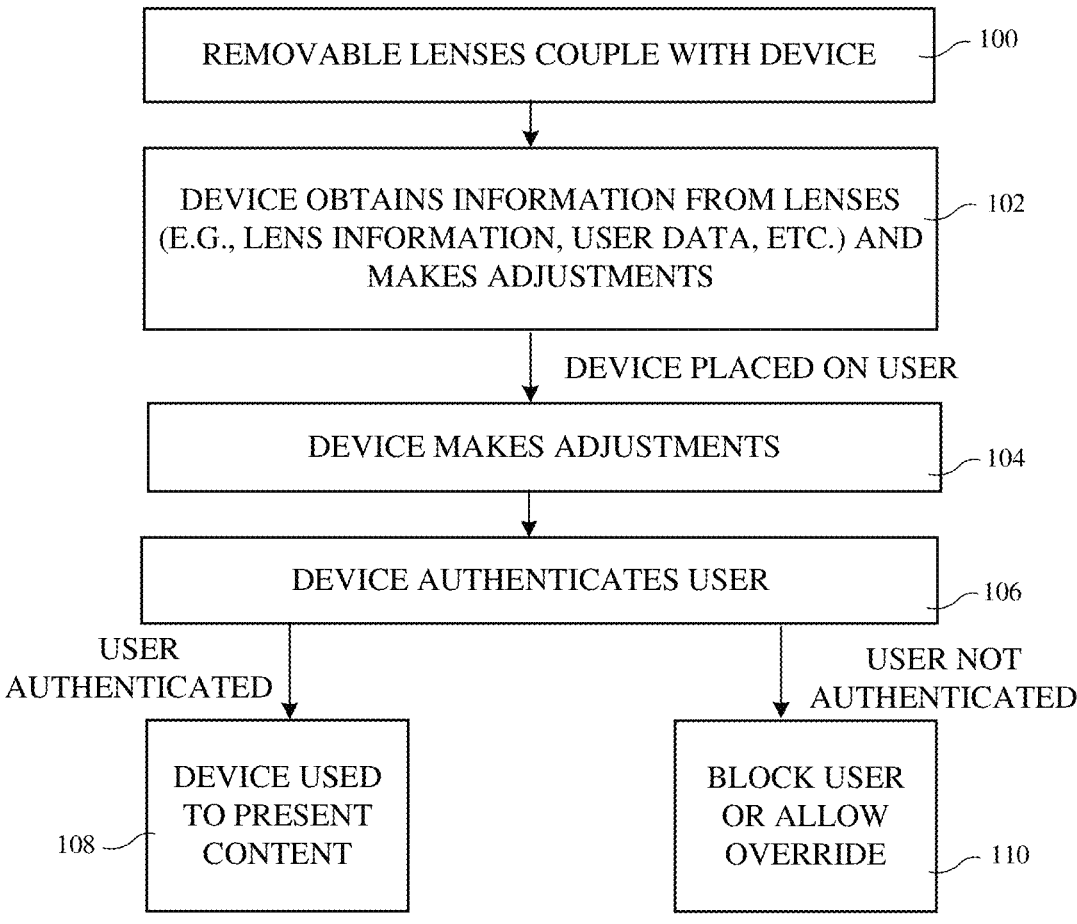
FIG. 4 is a flow chart of illustrative operations associated with using a head-mounted device in accordance with an embodiment.

Illustrative steps involved in using system 8 are shown in FIG. 4.

During the operations of block 100, a user who desires to use device 10 but who has specific visual defects (astigmatism, etc.) may attach a removable lens system that is associated with that user to device 10. During attachment of the removable lens system, removable lens support structures such as lens modules 74 may be aligned with non-removable lens support structures such as lens modules 70, so that lenses 76 are aligned with corresponding lenses 72. Coupling structures 78 and 80 may be used to hold lens modules 74 and 70 together. The presence of lenses 76 in alignment with lenses 72 allows the optical properties of lenses 76 to modify the optical properties of lenses 72 (e.g., to increase or decrease lens power, to add lens asymmetry to compensate for user astigmatism, etc.). In this way, the optical system of device 10 may be tailored to the user's vision.

During the operations of block 102, control circuitry 12 of head-mounted device 10 may read information that has been stored in the removable lens system (e.g., using gaze trackers 86, a visible-light image sensor, a memory reader such as reader 82, etc.). The information that is read may be stored using a bar code, text, other optically readable patterns (e.g., patterned ink, patterned metal, or other patterned structures), and/or using electrical data storage arrangements (see, e.g., bar code 92, visible information 90, and electrically stored information in storage 84 of FIG. 3).

In general, any suitable data may be stored in the removable lens system. This information may include, for example, information regarding the user that is associated with the removable lens system such as the user's eyeglass prescription (e.g., the spherical component of the user's prescription to be handled by spherical lens power, the astigmatic component of the user's prescription to be handled by an aspherical lens power, and/or the interpupillary distance of the user's prescription), the date of the prescription, the expiration date of the prescription, the user's username and other user credentials, manufacturing information such as the date of manufacture of the removable lens system, the name of the manufacturer, a serial number, a lot number, and a model name or other model type information, lens materials for lenses 76, lens powers (e.g., spherical lens power and/or aspherical lens power) and/or other optical characteristics of lenses 76 such as known aberrations that can be later corrected using compensating image warping operations performed by control circuitry 12 during video playback, and/or other information.

After reading this information from the removable lens system during the operations of block 102, control circuitry 12 may, if desired, make adjustments to the components in device 10. These adjustments may be made based on real-time measurements from gaze trackers 86 and/or based on the stored data obtained from the removable lens system. For example, control circuitry 12 may use positioners 58 to adjust lens-to-lens spacing based on real-time measurements of the user's interpupillary distance determined from the positions of the user's pupils measured with gaze trackers 86 and/or based on stored interpupillary distance information for the user that is obtained from removable lens modules 74. Control circuitry 12 may also adjust the positions of the lenses in device 10 along the Z axis of FIG. 2 to place lenses 72 and associated supplemental lenses 76 in a satisfactory location to allow the user to view content on displays 14. These focusing adjustments with lenses 72 and 76 may be made based on the user's prescription, the powers of lenses 76, and other information obtained using the stored information in lenses 76. In arrangements in which lenses 72 have adjustable power (e.g., when lenses 72 are tunable lenses), control circuitry 12 can adjust lenses 72 to implement the spherical component of the user's prescription. The asymmetric component of a user's prescription may be handled using the asymmetric portion of supplemental lenses 76 (as an example).

After making adjustments to device 10 based on information from the supplemental lens system formed from lenses 76, a user may place device 10 on the user's head.

During the operations of block 104, control circuitry 12 may make further adjustments to the components in device 10. For example, control circuitry 12 may use positioners 58 to adjust the lens-to-lens separation of left and right lenses 72 (and left and right lenses 76) based on information from sensors in device 10 (e.g., based on a measured interpupillary distance gathered using gaze trackers 86).

During the operations of block 104, an iris scanner, fingerprint sensor, input-output devices that gather username and password information, or other components may be used in authenticating the user. The user may, for example, be directed to supply a username and password so that control circuitry 12 can establish a communications link with an online service that provides media content (block 108). If the user is not authenticated by control circuitry 12 (e.g., if the user' username and password or other credentials (biometric information, etc.) are not authenticated, control circuitry 12 can, during the operations of block 110, prevent the user from accessing the online service, selectively block content, and/or take other suitable action. If desired, the user may be allowed to override the authentication process at block 110 and/or additional authentication techniques may be used in scenarios in which the user fails authentication during the operations block 106.

In some configurations of device 10, lenses 76 may carry user information (e.g., user game preferences, user movie preferences, etc.). In these configurations, control circuitry 12 can refrain from decoding this information until the user has been authenticated during the operations of block 106 and an appropriate decryption key has been obtained (e.g., the user's password).

In some embodiments, user information is stored by control circuitry 12. The user information may include information on a user's eye glasses prescription (e.g., a required optical prescription strength). The information stored in lenses 76 may include information on the optical prescription strength of lenses 76. After determining the user of device 10 and retrieving the user's stored prescription from control circuitry 12, control circuitry 12 may compare this retrieved user prescription information with the prescription of lenses 76 to determine if there is a satisfactory match. In the event that the prescription of lenses 76 does not match the user's prescription, control circuitry 12 may use display 14 and/or other output circuitry to issue a visible and/or audible alert for the user and may, if desired, decline to display content on display 14.

In scenarios in which optical aberration information is included in the information stored in lenses 76 (e.g., information indicating that lenses 76 have a particular amount of barrel distortion, pincushion distortion, spherical aberration, chromatic aberration, etc.), control circuitry 12 may, during the playback operations of block 108, apply geometric transformations or other video processing to the content being displayed on display 14 that compensates for this distortion. In this way, a user may view content that is free or nearly free of aberrations. If, as an example, lenses 76 exhibit pincushion distortion of a particular amount, information on this amount of pincushion distortion can be stored in lenses 76. During playback operations, control circuitry 12 can apply compensating (barrel) image warping to the content for display 14 to ensure that the displayed content exhibits low distortion and aberrations, thereby enhancing the content viewing experience for the user. In general, control circuitry 12 may apply any image processing correction that helps enhance image quality and the user's viewing experience. For example, corrections can be applied to correct for chromatic aberration, spherical aberration, etc.

As described above, one aspect of the present technology is the gathering and use of information gathered from a removable supplemental lens to enhance operation of a head-mounted display. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, interpupillary distance, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

In accordance with an embodiment, a system is provided that includes a head-mounted support structure, a display coupled to the head-mounted support structure, control circuitry configured to supply content using the display, a non-removable lens coupled to the head-mounted support structure that is configured to present the content from the display in an eye box, and a removable supplemental lens removably coupled to head-mounted support structure between the non-removable lens and the eye box, the removable supplemental lens is configured to store information that is retrieved by the control circuitry.

In accordance with another embodiment, the system includes a gaze tracking system having a light emitter and an infrared image sensor, the removable supplemental lens has a bar code that stores the information, the bar code is opaque at infrared wavelengths and transparent at visible wavelengths, and the image sensor is configured to read the bar code while the removable supplemental lens is removably coupled to the head-mounted support structure.

In accordance with another embodiment, the bar code includes infrared-opaque-and-visible-light-transparent ink on a clear lens element in the removable supplemental lens.

In accordance with another embodiment, the information includes information selected from the group consisting of an eyeglass prescription, an eyeglass prescription date of expiration, a username, a manufacturing date, a manufacturer, a serial number, a manufacturing lot number, a model name, a model type, and information on optical characteristics of the removable supplemental lens.

In accordance with another embodiment, the system includes a data reading device coupled to the head-mounted support structure, the control circuitry is configured to use the data reading device to obtain the information from the removable supplemental lens.

In accordance with another embodiment, the information includes an eyeglasses prescription.

In accordance with another embodiment, the removable supplemental lens includes memory and the data reading device is configured to obtain the information from the memory.

In accordance with another embodiment, the removable supplemental lens includes text and the data reading device is configured to obtain the information by optically reading the text.

In accordance with another embodiment, the removable supplemental lens includes circuitry configured to store data and the data reading device is configured to obtain the information from the circuitry.

In accordance with another embodiment, the removable supplemental lens includes programmable read only memory, the data reading device is configured to obtain the information from the programmable read only memory, and the information includes a lens characteristics of the removable supplemental lens.

In accordance with another embodiment, the lens characteristic includes a lens power associated with the removable supplemental lens.

In accordance with another embodiment, the lens characteristic includes an aspherical lens power associated with the removable supplemental lens.

In accordance with another embodiment, the lens characteristic includes an optical aberration associated with the removable supplemental lens.

In accordance with another embodiment, the control circuitry is configured to obtain the information when the removable supplemental lens is coupled to the head-mounted support structure.

In accordance with another embodiment, the information includes information selected from the group consisting of a username, a serial number, optical characteristics of the removable supplemental lens, and eyeglass prescription information.

In accordance with an embodiment, a head-mounted device, is provided that includes head-mounted support structures, a display configured to display content, left and right positioners, a non-removable lens system having left and right lenses that are positioned respectively by the left and right positioners, a removable lens system with removable supplemental left and right lenses that are removably coupled to the head-mounted support structures in alignment respectively with the right and left lenses, and control circuitry configured to obtain information stored in the removable lens system.

In accordance with another embodiment, the information includes an interpupillary distance for a user and the control circuitry is configured to use the left and right positioners to adjust a lens-center-to-lens-center spacing associated with the left and right lenses to match the interpupillary distance.

In accordance with another embodiment, the head-mounted device includes an optically readable pattern on the removable lens system that stores the information.

In accordance with another embodiment, the head-mounted device includes an image sensor that optically reads the optically readable pattern to retrieve the information from the removable lens system.

In accordance with another embodiment, the image sensor includes an infrared image sensor in a gaze tracking system.

In accordance with another embodiment, the information includes a user's eyeglass prescription and the control circuitry is configured to adjust the left and right positioners based on the user's eyeglass prescription.

In accordance with an embodiment, an electronic device configured to operate with a removable supplemental lens system is provided that includes a display that displays content, control circuitry, a non-removable lens system configured to allow the display content to be viewed from eye boxes, a removable supplemental lens system, and head-mounted support structures that support the display and that support the non-removable lens system between the eye boxes and the display, the removable supplemental lens system is configured to be supported between the non-removable lenses and the eye boxes, the removable supplemental lens system is configured to store information, and the control circuitry is configured to obtain the information from the removable supplemental lens system when the removable supplemental lens system is between the non-removable lenses and the eye boxes.

In accordance with another embodiment, the electronic device includes lens positioners, the control circuitry is configured to use the lens positioners to adjust a lens-to-lens spacing associated with left and right lenses in the non-removable lens system based on the information obtained from the removable supplemental lens system.

In accordance with another embodiment, the information includes an optical prescription associated with the removable supplemental lens system and the control circuitry is configured to issue an alert to a user in response to determining that there is a mismatch between the user's prescription and the optical prescription associated with the removable supplemental lens system.

In accordance with another embodiment, the information includes distortion information specifying an optical distortion associated with the supplemental lens system and the control circuitry is configured to apply a compensating correction to the content being displayed on the display based on the distortion information.

The foregoing is merely illustrative and various modifications can be made to the described embodiments. The foregoing embodiments may be implemented individually or in any combination.

What is claimed is:

1. A head-mounted device, comprising:
a head-mounted support structure;
a left lens module in the head-mounted support structure, wherein the left lens module comprises a left display and a left non-removable lens through which the left display is viewable;
a right lens module in the head-mounted support structure, wherein the right lens module comprises a right display and a right non-removable lens through which the right display is viewable;
left and right positioners in the head-mounted support structure configured to adjust respective positions of the left and right lens modules to match an interpupillary distance of a user;
a left supplemental lens module including a left supplemental lens configured to magnetically attach to the left lens module;
a right supplemental lens module including a right supplemental lens configured to magnetically attach to the right lens module, wherein the left and right displays are configured to adjust displayed content in response to the left and right supplemental lenses being attached to the left and right lens modules; and left and right gaze trackers respectively in the left lens module and the right lens module, wherein the left gaze tracker is configured to monitor a direction of gaze of the user through the left non-removable lens and the left supplemental lens, and the right gaze tracker is configured to monitor the direction of gaze of the user through the right non-removable lens and the right supplemental lens.

2. The head-mounted device of claim 1, wherein the head-mounted support structure comprises head-mounted goggles.

3. The head-mounted device of claim 2, wherein the head-mounted support structure further comprises a head strap.

4. The head-mounted device of claim 3, wherein the left and right positioners comprise motors.

5. The head-mounted device of claim 4, wherein the left and right supplemental lenses are configured to compensate for an astigmatism of the user.

6. The head-mounted device of claim 4, wherein the left and right supplemental lens modules each includes at least one additional supplemental lens.

7. The head-mounted device of claim 4, wherein the left and right lens modules comprise first magnetic structures, the left and right supplemental lenses comprise second magnetic structures, and the first and second magnetic structures are configured to be coupled together to couple the left and right supplemental lenses to the left and right lens modules.

8. The head-mounted device of claim 7, wherein the first and second magnetic structures are configured to align the left and right supplemental lenses with the respective left and right non-removable lenses.

9. The head-mounted device of claim 8, wherein the left and right positioners are configured to adjust the respective positions of the left and right lens modules and the left and right supplemental lenses when the left and right supplemental lenses are attached to the left and right lens modules.

10. The head-mounted device of claim 4, further comprising:

a single removable lens holder that is configured to house the left and right supplemental lens modules, wherein the single removable lens holder is configured to magnetically attach to the left and right lens modules.

11. The head-mounted device of claim 4, wherein the left and right non-removable lenses comprise catadioptric lenses.

12. A head-mounted device, comprising:

a head-mounted support structure comprising head-mounted goggles;

a head strap configured to couple the head-mounted support structure to a head of a user;

a left lens module in the head-mounted support structure, wherein the left lens module comprises a left display and a left non-removable lens through which the left display is viewable, and wherein the left lens module comprises a first magnetic coupler;

a right lens module in the head-mounted support structure, wherein the right lens module comprises a right display and a right non-removable lens through which the right display is viewable, and wherein the right lens module comprises a second magnetic coupler;

a left supplemental lens module including a left supplemental lens configured to removably attach to the left lens module, wherein the left supplemental lens module comprises a third magnetic coupler that is configured to removably attach to the first magnetic coupler of the left lens module;

a right supplemental lens module including a right supplemental lens configured to removably attach to the right lens module, wherein the right supplemental lens module comprises a fourth magnetic coupler that is configured to removably attach to the second magnetic coupler of the right lens module;

left and right positioners in the head-mounted support structure configured to adjust respective positions of the left and right lens modules and the left and right supplemental lenses when the left and right supplemental lenses are attached to the left and right lens modules; and left and right gaze trackers respectively in the head-mounted support structure, wherein the left and right displays are configured to adjust displayed images in response to a gaze measured by the left and right gaze trackers.

13. The head-mounted device of claim 12, wherein the left and right supplemental lenses comprise prescription lenses.

14. The head-mounted device of claim 13, wherein the left gaze tracker is configured to monitor a direction of gaze of the user through the left non-removable lens and the left supplemental lens, and the right gaze tracker is configured to monitor the direction of gaze of the user through the right non-removable lens and the right supplemental lens.

15. The head-mounted device of claim 14, wherein the left and right positioners are configured to adjust the respective positions of the left and right lens modules based on the direction of gaze of the user.

16. The head-mounted device of claim 12, wherein the left and right lens modules further comprise first threaded fasteners, the left and right supplemental lenses further comprise second threaded fasteners, and the first and second threaded fasteners are configured to removably attach the left and right supplemental lenses to the respective left and right lens modules.

17. A head-mounted device, comprising:

a head-mounted support structure;

a head strap configured to couple the head-mounted support structure to a head of a user;

a left lens module in the head-mounted support structure, wherein the left lens module comprises a left display and a left non-removable lens through which the left display is viewable;

a right lens module in the head-mounted support structure, wherein the right lens module comprises a right display and a right non-removable lens through which the right display is viewable;

left and right positioners in the head-mounted support structure configured to adjust respective positions of the left and right lens modules to match an interpupillary distance of the user;

a left supplemental lens module including a left supplemental lens;

a right supplemental lens module including a right supplemental lens;

first magnetic couplers in the left and right lens modules;

second magnetic couplers in the left and right supplemental lens modules, wherein the first and second magnetic couplers are configured to removably attach the left and right supplemental lenses to the left and right lens modules, and wherein the left and right positioners are configured to adjust the respective positions of the left and right lens modules and the left and right supplemental lenses in response to the left and right supplemental lenses being attached to the left and right lens modules; and left and right gaze trackers respectively in the head-mounted support structure, wherein the left gaze tracker is configured to monitor a direction of gaze of the user through the left non-removable lens and the left supplemental lens, and the right gaze tracker is configured to monitor the direction of gaze of the user through the right non-removable lens and the right supplemental lens.

\* \* \* \* \*